May 8, 1962     G. E. ATKINSON ET AL     3,033,251

DOUBLE EDGED BLADES FOR SABRE SAW

Filed July 7, 1960     2 Sheets-Sheet 1

INVENTOR
GEORGE E. ATKINSON
JOHN K. ALLEN

BY

*Leonard Bloom*

ATTORNEY

INVENTOR
GEORGE E. ATKINSON
JOHN K. ALLEN

BY  *Leonard Bloom*

ATTORNEY 3,033,251
DOUBLE EDGED BLADES FOR SABRE SAW
George E. Atkinson, Linthicum Heights, and John K. Allen, Cockeysville, Md., assignors to The Black and Decker Manufacturing Company, Towson, Md., a corporation of Maryland
Filed July 7, 1960, Ser. No. 41,311
1 Claim. (Cl. 143—133)

The present invention relates to double-edged blades for a sabre saw, and more particularly, to such blades that will facilitate the making of a conventional pocket cut.

Sabre saws may be used for a variety of purposes, such as the making of rectangular openings comprising a series of joined pocket cuts in a wall, along a baseboard, or on a floor, ceiling, or rafter. In this particular operation, when using the sabre saw blades of the prior art, it is necessary to continually and periodically take the sabre saw out of the work and to reverse it or tilt it in such a manner so as to enable the cutting edge of the blade to make a new pocket cut, thus requiring considerably more time and skill on the part of the operator.

Accordingly, it is an object of the present invention to alleviate these difficulties by providing a double-edged blade for a sabre saw.

It is a further object of the present invention to provide a double-edged sabre saw blade having a main body portion which includes a pair of parallel cutting edges.

It is yet another object of the present invention to provide a double-edged sabre saw blade, which (when mounted upon a conventional reciprocating shaft) will have its upper cutting edge parallel to the longitudinal axis of the reciprocating shaft, and which will further have its lower cutting edge disposed at a slight acute angle with respect to the longitudinal axis of the reciprocating shaft.

Figure 1:
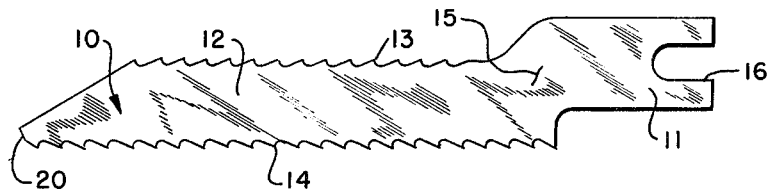
Figure 3:
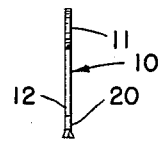
Figure 2:
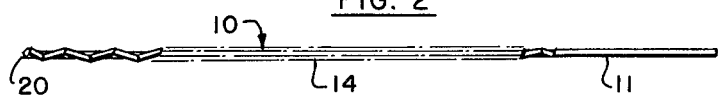
Figure 4:
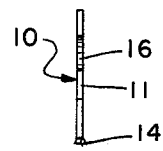
Figure 5:
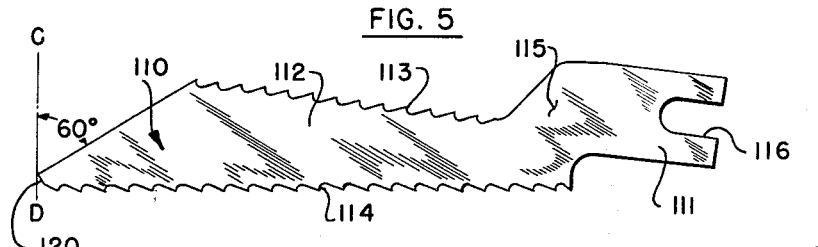
Figure 7:
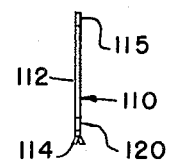
Figure 6:
Figure 8:
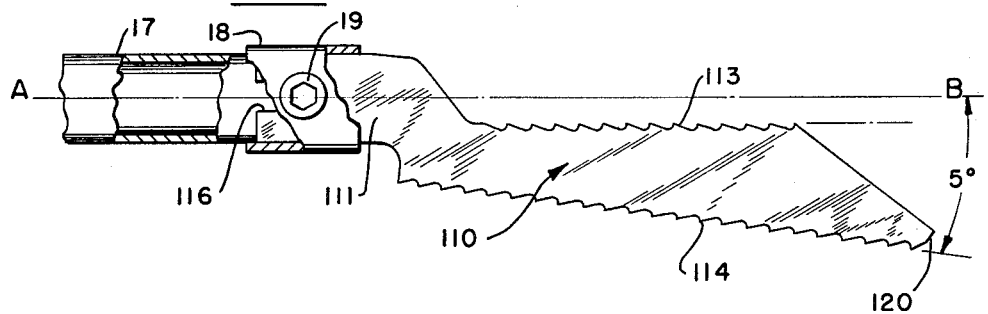
Figure 9:
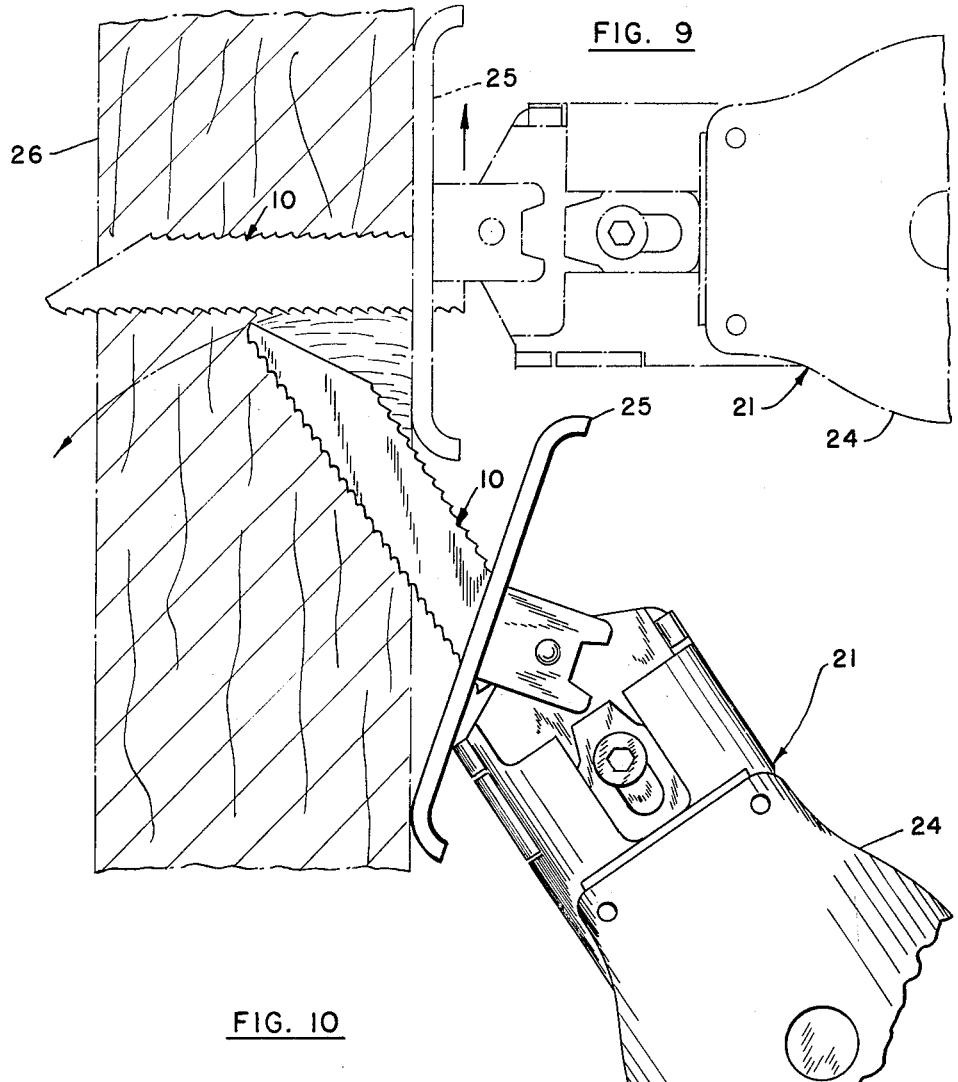
Figure 10:
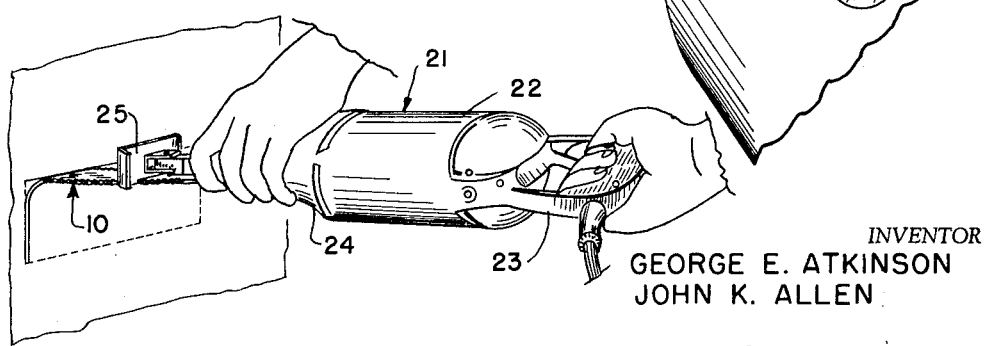

These and other objects of the present invention will become apparent upon an inspection of the enclosed drawings taken in conjunction with the foregoing specification, in which:

FIGURE 1 is a plan view of one species of the present invention;
FIGURE 2 is a bottom view thereof;
FIGURE 3 is a front end view thereof;
FIGURE 4 is a rear end view thereof;
FIGURE 5 is a plan view of a second species of the present invention;
FIGURE 6 is a bottom view thereof;
FIGURE 7 is a front end view thereof;
FIGURE 8 shows this second species of the present invention as it would be mounted upon the conventional reciprocating shaft of the sabre saw; and
FIGURES 9 and 10 illustrate the utility of the present invention as incorporated in a conventional sabre saw, showing how a pocket cut would be started with the lower cutting edge of the blade, and further showing how it is possible to make a series of continuous pocket cuts (without removing the sabre saw from the work) by switching over from the lower cutting edge of the blade to the upper cutting edge thereof and moving the saw upwards and thence sideways into the work.

With particular reference to FIGURES 1–4, there is illustrated a double-edged blade 10 for a sabre saw, having a shank portion 11 and an integral main body portion 12 extending therefrom. The main body portion 12 is provided with a pair of side edges consisting of an upper cutting edge 13 and a lower cutting edge 14 which terminates at the tip 20, it being noted that cutting teeth are formed on each of the side edges. It will be appreciated, however, that the type of cutting teeth illustrated in the drawings is only for sake of convenience, and that the essence of the present invention is not necessarily to be limited thereby.

The double-edged blade is further provided with an intermediate portion 15 which interconnects the shank portion 11 with the integral main body portion 12. It will be further appreciated that the main body portion 12 is disposed in the same plane as the shank portion 11, but is offset downwardly therefrom, which is a preferable although not a necessary form of the present invention.

The shank portion 11 further has a slot 16 formed therein so as to enable the double-edged blade 10 to be conveniently secured to the reciprocating shaft of the sabre saw in a manner hereinafter to be described in detail.

With particular reference to FIGURES 5–7, there is illustrated a second species of the present invention in which the double-edged blade 110 is provided with a shank portion 111 having a slot 116, an integral main body portion 112 having an upper cutting edge 113 and a lower cutting edge 114, together with an intermediate portion 115 in much the same purpose and fashion as the first species of the present invention.

It will be further appreciated from FIGURES 5–7 that the upper cutting edge 113 is not parallel to the lower cutting edge 114; and the purpose of this may be seen more clearly from an examination of FIGURE 8, which shows the second species of the present invention as it would be secured to a reciprocating shaft, a fragmentary portion of which is indicated generally at 17. The reciprocating shaft 17 is generally tubular in nature as is illustrated in the drawings, and a suitable collar 18 together with a hexagonal-head screw 19 passing through slot 116 may be used to secure the blade 110 to the shaft 17 in a manner which is well-known in the art. It will be seen from an examination of FIGURE 8 that when the blade 110 is thus secured to the reciprocating shaft 17, that the upper cutting edge 113 of the blade 110 will be parallel to the longitudinal axis A—B of the reciprocating shaft 17, and further, that the lower cutting edge 114 of the blade 110 will be disposed at a slight acute angle with respect to the longitudinal axis of the reciprocating shaft. This slight acute angle is preferably, but not necessarily, in the order of approximately 5°. Moreover, and of even greater significance, the top cutting edge 113 (as shown in FIG. 5) diverges outwardly with respect to the bottom cutting edge 114 at a relatively-small first acute angle, while the auxiliary edge from the tip portion 120 to the top cutting edge 113 is disposed at a second acute angle with respect to a normal drawn to the bottom edge 114, the second acute angle being relatively-larger than the first acute angle. This naturally strengthens the blade 110 and allows it to be used on pocket cutting operations without undue breakage or blade failure, yet the proportions of blade 110 are such as to avoid an otherwise undesirable "pounding effect" on pocket cutting operations.

FIGURE 5 further shows that the lower cutting edge 114 terminates in a forwardly-projecting tip 120, and that the tip 120 to the upper cutting edge is cut back at an angle of approximately 60° with respect to a vertical line C—D perpendicular to the lower cutting edge 113, this degree of angular cut-back of the blade 110 being preferable in facilitating the use of the blade 110 in the making of a suitable pocket cut.

FIGURES 9 and 10 then illustrate the inherent utility of the present invention in the making of a pocket cut. As shown in FIGURES 9 and 10, the sabre saw 21 has a motor housing 22, an integral switch handle 23, a gear case 24, and a pivotable shoe 25; and in using, say the first species of the present invention (namely, the double-edged blade 10 which is illustrated in FIGURES 1–4) sabre saw 21 will approach the work 26 at a slight angle such that the shoe 25 will have one edge thereof resting against the surface of the work 26 to enable the tip 20 and the lower cutting edge 14 to dig into the work 26 to get the pocket cut started. Then the operator may hold the sabre saw 21 in any convenient position such that after having started the pocket cut with the lower cutting edge 14 of the blade 10, he then progressively cuts into the work 26 and draws the sabre saw 21 upwards (or forwardly, as the case may be) into the work 26 such that the upper cutting edge 13 is now doing the brunt of the work in making the pocket cut, all of which may be done (as shown in phantom view in FIGURE 9) in an easy and simple and straightforward manner without having to take the sabre saw 21 out of the work 26 and/or to reverse the mounting of the blade 10 upon the shaft 17. Also, in using the techniques of the present invention, the operator can maintain the sabre saw 21 within the work 26 and continually work it up, down, or around such that first the lower cutting edge 14 is brought into play and then the upper cutting edge 13 may be brought into play, alternately as desired by the operator, so as to make a smooth and continuous series of pocket cuts in the work 26. As shown more specifically in FIGURE 10, the operator may tilt the saw sideways to make a new (that is to say, continuous) pocket cut at substantially right angles to the previous pocket cut; and then after having made a suitable rectangular opening in the work in such a manner, he may go back over the work so as to square the corners of the opening. This "squaring-off" step may be done after the continuous pocket cut is made, or as desired, on a corner-per-corner basis.

Obviously, many modifications may be made without departing from the basic spirit of the present invention. Therefore, it is to be understood that within the scope of the appended claim, the invention may be practiced other than has been specifically described.

We claim:

For use with a power-driven sabre saw having a reciprocating shaft, a sabre saw blade for pocket cutting operations comprising a shank portion having means formed therein for mounting the blade to the reciprocating shaft and an integral body portion extending forwardly of said shank portion, said body portion having three edges comprising a top edge, a bottom edge having cutting teeth formed thereon, said top and bottom edges continually diverging with respect to each other outwardly of said shank portion at a relatively-small acute angle in the order of 5 degrees, at least one of said top and bottom edges being disposed at a slight acute angle with respect to the axis of reciprocation, and an auxiliary edge intersecting said bottom edge and said top edge, said auxiliary edge and said bottom edge joining to form a tip for the blade, said auxiliary edge sloping back towards said shank portion and being disposed at an acute angle with respect to a normal drawn to said bottom edge, said last-named acute angle being approximately 60 degrees, and further being relatively larger than said first-mentioned acute angle, whereby said body portion of the blade has a transverse width which continually increases between said top and bottom edges outwardly of said shank portion, and which is greatest along a normal drawn to the bottom edge from the point where said auxiliary edge intersects said top edge, the blade thereby having sufficient strength for pocket cutting operations without entailing a pounding of the blade into the work.

References Cited in the file of this patent

UNITED STATES PATENTS

| | | |
|---|---|---|
| 865,348 | Allison | Sept. 10, 1907 |
| 1,898,956 | Harvie | Feb. 21, 1933 |
| 2,646,094 | Russsell | July 21, 1953 |
| 2,722,244 | Schultz | Nov. 1, 1955 |
| 2,735,458 | Buchmann | Feb. 21, 1956 |
| 2,783,792 | Keesling | Mar. 5, 1957 |